Sept. 28, 1937.    A. M. ROSS    2,094,411
ARC WELDING APPARATUS
Filed Dec. 26, 1934    2 Sheets-Sheet 1

INVENTOR
Albert M. Ross
BY
Harold Kaplan
ATTORNEY

Sept. 28, 1937.　　A. M. ROSS　　2,094,411
ARC WELDING APPARATUS
Filed Dec. 26, 1934　　2 Sheets-Sheet 2
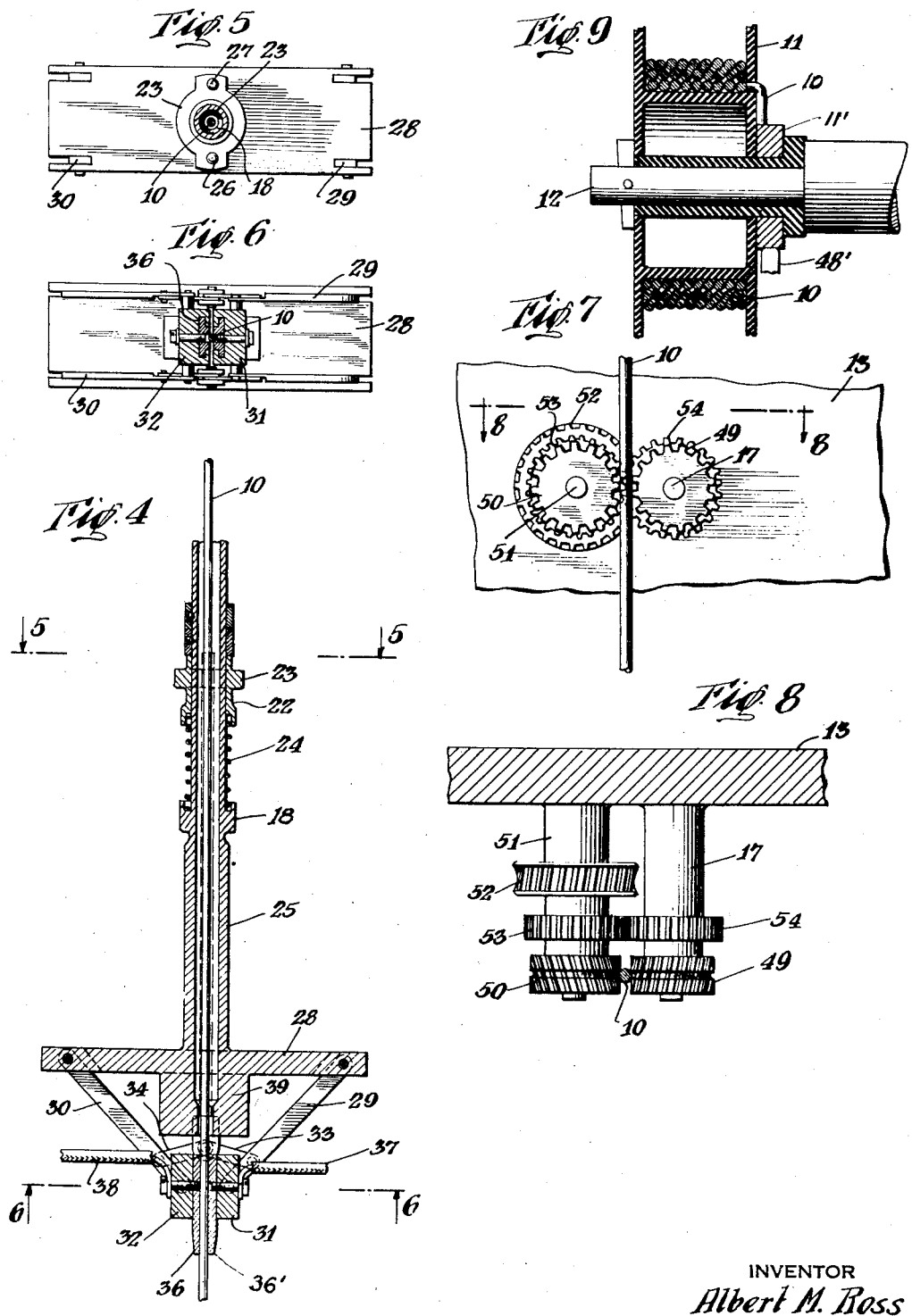

Patented Sept. 28, 1937

2,094,411

UNITED STATES PATENT OFFICE 2,094,411

ARC WELDING APPARATUS

Albert M. Ross, New Britain, Conn.

Application December 26, 1934, Serial No. 759,141

8 Claims. (Cl. 219—8)

The present invention relates to the art of automatic arc welding and more particularly to means and apparatus designed to hold and guide the welding electrode that is used in connection with automatic welding units.

The usual installation presently employed in automatic arc welding consists of a welding electrode which is automatically fed from a reel to the weld zone by means of a suitable feed roller arrangement. The electrode as it advances to the weld zone is adapted to pass through an electrode holder which is positioned over the object to be welded. The electrode holder is generally provided at its end with a nozzle which is connected to an electric current conductor. As the electrode passes through the nozzle, it makes a rubbing contact therewith and the current is thus conducted through the electrode to the weld zone, where an electric arc is produced between the electrode and the work. The heat of the arc fuses the metallic electrode and deposits the metal on the object to be welded.

One of the difficulties involved in the use of the present type of automatic welding apparatus is the excessive wear on the nozzle due to the rubbing contact between it and the electrode. The constant rubbing of the electrode against the inner wall of the nozzle usually causes enlargement of the orifice through which the electrode passes and results in arcing at the contact point; thus frequently causing the electrode to become frozen to the nozzle. Another disadvantage involved in the use of the present type of automatic welding apparatus is the necessity for having numerous nozzles with varying sizes of orifices to provide for varying sizes of welding electrodes. Another objection is the tendency of the nozzle to become clogged due to the lubricants used and the accumulation of foreign matter, thus interferring with the free passage of the electrode as it advances to the weld zone. It is, therefore, one of the objects of the present invention to provide a welding apparatus which is flexible in character, which will allow for the use of various sizes of electrodes and will permit free movement of the electrode as it advances to the weld zone, and which will provide positive current contacting means for the electrode, thus insuring the efficient operation of the automatic welding unit.

Other objects and advantages of the present invention will be pointed out hereafter and will in part be apparent to those skilled in the art to which the present invention relates.

With the above and other objects in view, the present invention consists of the novel construction and arrangement of parts hereafter described and illustrated in the accompanying drawings, forming an integral part of this specification.

In the accompanying drawings wherein there is shown a preferred embodiment of my invention, Fig. 1 is a top plan view of the automatic welding unit showing an embodiment of my present invention;

Fig. 4 is an enlarged sectional elevation of the welding apparatus constructed in accordance with the principles of my invention;

Fig. 5 is a section along the line 5—5 of Fig. 4;

Fig. 6 is a section along the line 6—6 of Fig. 4;

Fig. 7 is an enlarged front elevational view of the feed roller arrangement as embodied in the present invention;

Fig. 8 is a top plan view of the feed roller arrangement as seen along the line 8—8 of Fig. 7, and Fig. 9 is an enlarged detailed view along line 9—9 of Fig. 2 illustrating the drum and winding as embodied in the present invention.

Figure 1:
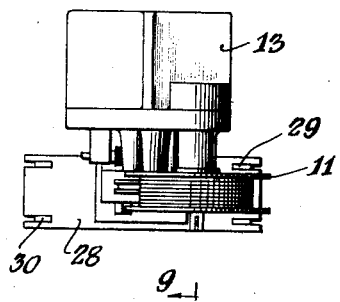

Referring to the drawings wherein like reference characters indicate corresponding parts throughout the several views, 10 represents the welding electrode, consisting of any suitable welding wire, which is unwound from the drum 11 mounted on a spindle 12 secured to the carriage 13. The carriage 13 is provided with wheels 43 and 44, running on rails 45 and 46 upon a suitable support 47. Mounted on suitable shafts secured to the carriage 13 are the straightening rollers 14, 15 and 16 and therebelow the feed roller arrangement which will be more fully described hereinafter. The electrode 10 is guided from the drum 11 between the straightening rollers and then between the feed rollers, and is advanced by the feed rollers through the electrode holder 19 to the weld zone and to the work 40.

The electrode holder 19 comprises a head 21, which is supported on the carriage 13 by a stem 20, and a barrel 25 depending therefrom. As illustrated more clearly in Fig. 4, the barrel 25 is provided with a flange 18 having an annular groove on its upper side to form a seat for one end of a spring 24. A sleeve 22 having a laterally extending flange 23, and an annular groove on its under side, is carried on the barrel 25 and rests on the other end of the spring 24. Integral with the lower end of the barrel 25 is a base plate 28 to which the upper ends of the pairwise members 29 and 30 are pivotally secured, the lower converging ends of which are pivotally connected to the jaws 31 and 32, and are preferably provided with porcelain bushings to insulate the joints from electrical and heat conduction. A pair of rods 26 and 27 having their upper ends connected to the flange 23 extend longitudinally on opposite sides of the barrel 25, through apertures in the base plate 28, the lower ends of said rods terminating in a toggle joint 35 having members 33 and 34 pivotally connected to the members 29 and 30. The jaws 31 and 32 are preferably provided on their inner surfaces with inserts 36 and 36' for engaging and contacting the electrode 10.

Electrical conductors 37 and 38 are attached to the jaws 31 and 32 and to a boss 39 integral with the base plate 28. A conductor 41 leading from a source of electricity is connected to the work piece 40 while another conductor 42 leading from the said source of electricity is connected to the head 21 and to the boss 39. A conductor 48 has one end connected to the head 21 and the other end contacts by means of a brush 48' with an end plate 11' on the drum 11. The end plate 11' is connected with the end of the electrode winding 10, as illustrated in Fig. 9.

As illustrated in Figs. 7 and 8 the feed roller arrangement comprises a pair of oppositely arranged grooved gears 49 and 50 having their teeth arranged on a slant so as to engage tangentially from opposite sides at the point of their engagement of the electrode 10. The gears 49 and 50 are mounted on shafts 17 and 51 secured to the carriage 13 in parallel spaced relationship. The shaft 51 carries a drive gear 52 and a coupling gear 53 which meshes with a similar gear 54 on shaft 17.

Figure 2:
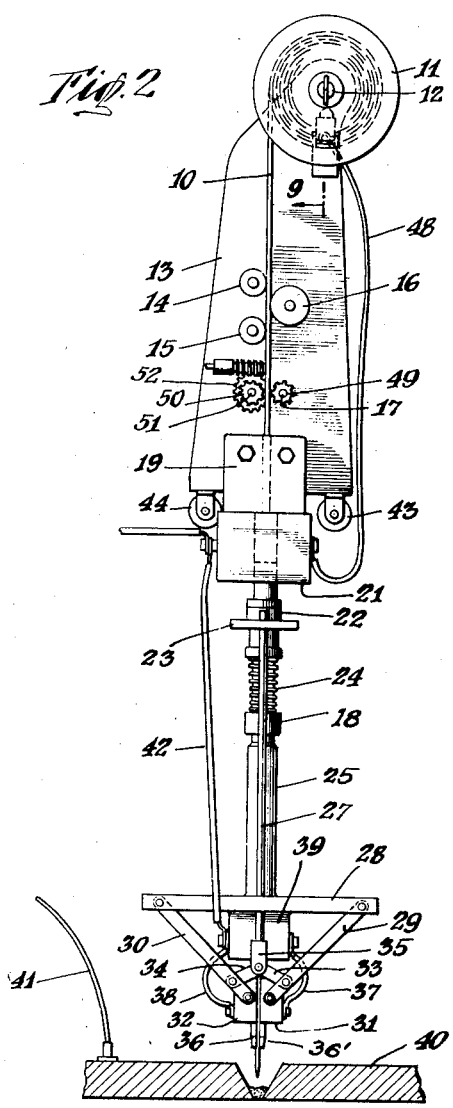
Fig. 2 is a front elevational view of said automatic welding unit.
Figure 3:
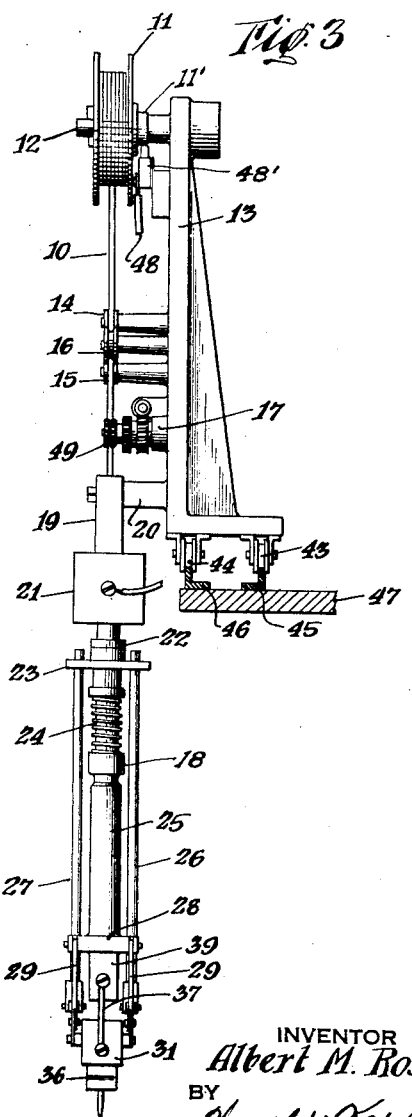
Fig. 3 is a side elevational view of said automatic welding unit.

From the foregoing description, having simultaneous reference to the drawings, the operation and use of my novel arc welding apparatus will be entirely clear. It will be evident that the toggle and spring arrangement by means of which the electrode is held and guided to the work provides resilient means of engaging the electrode as it advances to the weld zone, and thus eliminates wear at the contact point and permits free movement of the electrode. There is also provided by this arrangement positive current contacting means, thus preventing arcing at the contact point and insuring the efficient operation of the welding unit. It will be further evident that the connection of the end of the electrode winding to the head of the electrode holder, as illustrated in Fig. 2 and Fig. 3 of the drawings, provides a current path to the electrode in parallel with one lead of the circuit, so that in the event there is a tendency of arcing at the contact points between the electrode and the contacting members due to broken contact, the current will be diverted through the electrode winding, and the resistance of the coil will tend to eliminate the arcing.

It will be evident that the principle of my invention while mainly devised for use with automatic metallic arc welding units, may also be adapted for use with automatic carbon arc units, and that it may also be used for the continuous feed of any type of welding electrode, whether it is bare or composite coated welding wire and may be suitably adapted to manual applications. I do not wish to restrict myself to the specific embodiment of my invention as disclosed and illustrated in the accompanying drawings, and I, therefore, desire to have it understood that I may make changes in the general arrangement and in the construction of minor details thereof without departing from the spirit and scope of my invention as outlined in the appended claims.

Having thus described my invention, what I claim as new and desire to secure by Letters Patent is:

1. In an electric welding apparatus, substantially as described, an electrode holder comprising a vertically disposed conduit for guiding the electrode to the work piece, a toggle arrangement provided at the end of said conduit carrying cooperating contact members for engaging the electrode, and spring means mounted on said conduit and connected to said contact members whereby they are held resiliently against the electrode.

2. In an electric welding apparatus, substantially as described, a toggle arrangement for frictionally engaging the electrode comprising a transverse plate, cooperating jaws located below said plate, spring means located above said plate, members pivotally attached to said plate and to said jaws, other members pivotally attached to said first members, and third members pivotally attached to said second members and connected with said spring means.

3. In an electric welding apparatus, substantially as described, an electrode holder comprising a vertically disposed conduit for guiding the electrode to the work-piece, cooperating contact members located below said conduit, spring means mounted on said conduit, members pivotally attached to said conduit and to said contact members, and other members pivotally attached to said first named members and to said spring means whereby the contact members are held in frictional engagement against the electrode.

4. In an electric welding apparatus, substantially as described, an electrode holder comprising a vertically disposed conduit for guiding the electrode to the work piece, a plurality of cooperating contact members located below said conduit, spring means mounted on said conduit, members each having one end pivotally attached to the conduit and the other end pivotally attached to one of said contact members, other members each having one end pivotally attached to one of said first mentioned members intermediate the ends thereof and the other end pivotally attached to members connected to said spring means, whereby the contact members are held in frictional engagement against the electrode.

5. An electric welding apparatus comprising an electrode winding, means for continuously feeding the electrode to the work piece, a vertically disposed conduit for guiding the electrode, a toggle arrangement provided at the end of said conduit having cooperating contact members for engaging the electrode, spring means mounted on said conduit and connected to said contact members whereby they are held resiliently against the electrode, and means for supplying welding current to the electrode through said contact members.

6. An electric welding apparatus comprising an electrode winding, means for continuously feeding the electrode to the work piece, a vertically disposed conduit for guiding the electrode, cooperating contact members for engaging the electrode, a circuit for supplying welding current to the electrode through said contact members, and a resistance in parallel with the supply lead of the circuit, so that the supply current may flow into and through the electrode through said resistance.

7. An electric welding apparatus comprising an electrode winding, means for continuously feeding the electrode to the work piece, a vertically disposed conduit for guiding the electrode, cooperating contact members for engaging the electrode, a circuit for supplying welding current to the electrode through said contact members, the electrode winding being arranged in parallel with the supply lead of the circuit so that the supply current may flow into and through the electrode through said winding.

8. An electric welding apparatus comprising an electrode winding, means for continuously feeding the electrode to the work piece, a vertically disposed conduit for guiding the electrode, cooperating contact members for engaging the electrode near the arcing terminal, a circuit for supplying welding current to the electrode through said contact members, the end of the electrode winding being connected to the supply lead of the circuit to provide a supply path to the electrode in parallel with the circuit through the contact points.

ALBERT M. ROSS.